UNITED STATES PATENT OFFICE.

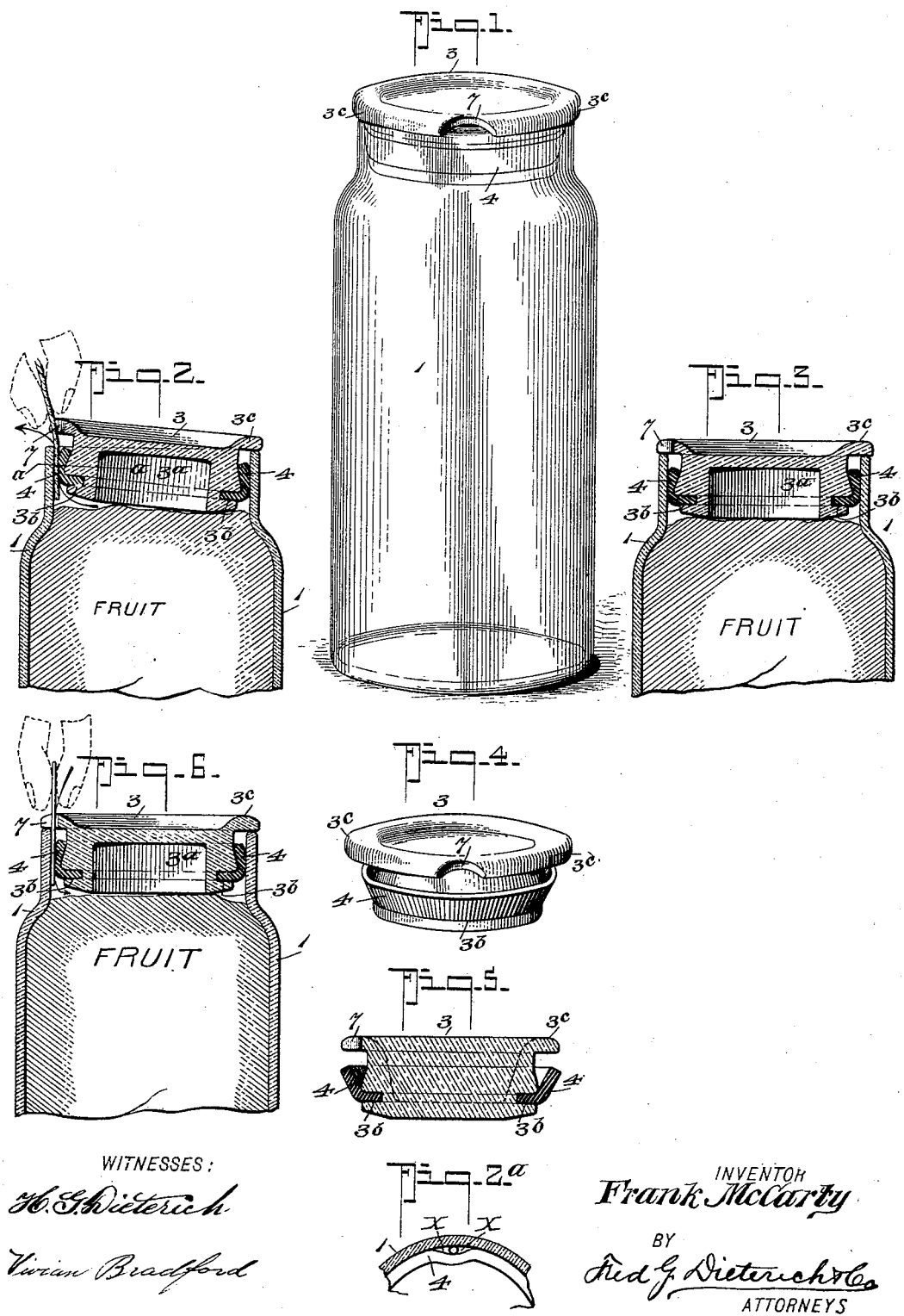

FRANK McCARTY, OF MARTIN'S FERRY, OHIO.

BOTTLE OR JAR STOPPER.

SPECIFICATION forming part of Letters Patent No. 633,468, dated September 19, 1899.

Application filed March 14, 1899. Serial No. 709,087. (No model.)

*To all whom it may concern:*

Be it known that I, FRANK MCCARTY, residing at Martin's Ferry, in the county of Belmont and State of Ohio, have invented certain new and useful Improvements in Bottle or Jar Stoppers, of which the following is a specification.

This invention relates to jar and bottle closures, and it more particularly refers to improvements in that form of jar or bottle stopper disclosed in my Patent No. 620,663, dated March 7, 1899.

In the practical use of a stopper constructed in accordance with my invention as set out in my other patent, No. 620,663, I have discovered that sometimes when the stopper is quickly or carelessly fitted into the jar, particularly so when the contents thereof are hot, an imperfect air-tight fitting of the stopper is produced by reason of the non-free escape of air from the jar-neck above the contents of the jar, and I have also found that when a stopper is fitted down perfectly airtight within the jar or bottle neck the same is held to its seat with such force that it can be withdrawn only with difficulty, it sometimes being necessary to break the jar to remove it.

My present invention seeks to provide certain improvements whereby the stopper disclosed in my patent aforesaid can be positively seated air-tight in the bottle or jar neck, even when quickly and carelessly applied, and whereby the same can with substantially no exertion or hand strain be quickly removed.

This invention also comprehends certain improvements on my patented stopper which will practically overcome any possibility of the stopper being blown out by the accumulation of gases or air within the jar incident in the fermentation of the contents or the condensation thereof, said invention also including certain detailed arrangement of parts having for its purpose to render the construction of the stopper the more economical, neat in appearance, and effective in its uses, all of which will be first described and then specifically pointed out in the appended claim, reference being had to the accompanying drawings, in which—

Figure 1 is a perspective view of a fruit-jar having my improved stopper applied. Fig. 2 is a section of the upper portion of a jar, illustrating the manner of fitting the stopper in place to provide an air-tight joint. Fig. 2$^a$ is a section on the line $a\,a$ of Fig. 2. Fig. 3 is a section of the neck part of the jar with the stopper down in place. Fig. 4 is a view of the stopper detached. Fig. 5 is a view of a modified form of the stopper. Fig. 6 is a detail view illustrating the manner of removing the stopper.

Referring to the accompanying drawings, in which like numerals and letters indicate like parts in all the figures, 1 indicates the jar or bottle, which, as will be seen from the drawings, has its neck made smooth externally and internally.

My present form of closure or stopper device has the same general construction as the one shown in my other patent. In the present invention the body of the stopper—meaning all of the stopper except the washer or gasket—is preferably made of glass, and the bottom of jar portion 3 in the preferred form, as shown in Figs. 2, 3, and 6, hollowed, as at 3$^a$, the purpose of which will hereinafter be explained.

The body 3 of the stopper has a diameter somewhat less than the bottle-neck which it is intended to fit, the same as in my patented stopper; but in the present form the said body has an annular seat 3$^b$, adapted to receive the rubber washer or gasket 4, which gasket has a diameter greater than that of the bottle-neck. To provide for a perfect grip of the gasket 4 against the wall of the bottle-neck when the stopper is forced down in place, the body 3 is bowed or swelled out just above the seat 3$^b$ to reduce the space between the said body 3 and the bottle-neck at this point and also to provide a beveled seat portion, whereby to cause the gasket to be the more tightly squeezed in place between the body of the stopper and the bottle-neck, as clearly illustrated in Fig. 3 of the drawings. The upper part of the stopper is formed with an annular rim 3$^c$, which constitutes in the present invention the finger-grip portion of the stopper.

It will be noticed by reference to the drawings that by forming the grip portion at the upper end the top of the stopper can be made flat and the danger of dust collection, as is likely to occur in the form shown in my patent aforesaid, is overcome, the said top also providing a convenient flat seat for supporting other jars when they are set in bulk or tiers.

So far as described, excepting the hollow 3ª and the beveled bearing for the gasket, my present stopper embodies the same principles of construction as my other patented stopper. In this present form, however, means are provided whereby access can be conveniently had to the washer or gasket for forcing a part of the same out away from the bottle-neck to provide a vent for the egress or access of air out of or into the jar, as conditions may make desirable. For this purpose the flange 3ᶜ is formed with a notch or recess 7, that extends about in line with the outer face of the body 3. This recess 7 forms an essential feature of this invention, and the advantages thereof will be readily apparent from the following.

As before stated, in my patented form of stopper when the same is carelessly or quickly applied an imperfect fitting thereof is sometimes had, as the air that collects in the bottle-neck is not properly bled off from the jar. By providing the grip-flange with a recess, as described, it will be seen that when it is desired to apply the stopper the user need only drop a piece of string or a thin wire or other like article down over the internal face of the bottle-neck at a point in line with the recess of the stopper. By then fitting the stopper into place in the manner illustrated in Fig. 2 it is obvious that as the gasket at the point where it engages with the string or wire is held from engagement with the wall of the bottle-neck vent-openings X X are provided (see Fig. 2ª) for the ready escape of air held under the stopper, it being understood that when the stopper is tightly fitted down by pulling out the string or wire or other article the gasket will immediately close tightly down and close the vent, thus providing a positive air-tight seat on the stopper, the suction or pressure force thereon being increased as the contents of the jar condense. The recess in the rim of the stopper also provides for a quick removal of the stopper in such a manner that the same may be withdrawn by any one, even a child, for the reason that when it is desired to remove the stopper it is only necessary to insert a piece of wire or other similar implement down through the recess 7 between the edge of the gasket and the bottle-neck sufficient to produce a vent to allow air to enter under the stopper. This permits the stopper being pulled out in the manner illustrated in Fig. 6.

As before stated, in the preferred form the body 3 is made hollow. This I have found advantageous, for the reason that a chamber is provided within the stopper in which the gases or air that are generated by the condensation or fermentation of the contents of the jar can collect, it being manifest that by providing this air-pocket the pressure of air or gas within the jar upon the gasket, which would be entirely against the same were there no pocket provided, is reduced to the minimum and danger of any part of the gasket which might not be tightly gripped to the bottle-neck being blown open by the gases held within the jar is reduced to the minimum, thereby providing for a more perfect sealing of the jar and the danger of the stopper being blown out overcome. For the reasons just stated I prefer to form the stopper with the air-receiving pocket, yet it will be understood that the stopper-body may be made solid, as in my patent referred to and as illustrated in Fig. 5 of the present drawings.

In the practical construction of my invention I make the pendent portion of the stopper, the washer, and the flange 3 of such relative proportions that after the stopper is fitted into the bottle-neck a space will still remain surrounding the stopper above the washer-joint. This is advantageous, as the opening in the flange 3 registers with the said space. Such space can be readily filled by cement or other substance that will melt by heating, and thereby produce an absolutely air-tight joint.

Having thus described my invention, what I claim, and desire to secure by Letters Patent, is—

The hereinbefore-described improvement in jar and bottle closures, comprising in combination with a bottle or jar having a straight-way internal-neck portion; a stopper having a pendent member of less diameter than the bottle-neck whereby a space intervening the stopper and the neck is provided; a washer secured to the lower end of the pendent member of the stopper of greater diameter than that of the bottle-neck, and adapted to bend up into the intervening space to make an air-tight joint, said stopper having an annular flange of greater width than the bottle whereby to seat upon the rim of the said bottle-neck; said annular flange; the washer-joint; and the washer, being so arranged relatively, that a space will be provided between the washer and the stopper-flange, said stopper-flange having an opening communicating with the space above the washer, whereby a filling substance can be entered through the flange-opening to close the space above the washer, as specified.

FRANK McCARTY.

Witnesses:
FRED G. DIETERICH,
A. E. DIETERICH.